United States Patent
Shao et al.

(10) Patent No.: US 12,051,315 B2
(45) Date of Patent: Jul. 30, 2024

(54) METHODS, INTERNET OF THINGS SYSTEMS, AND STORAGE MEDIA FOR SMART GAS PIPELINE NETWORK INSPECTION

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Feng Wang, Chengdu (CN); Quan Wang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/360,845

(22) Filed: Jul. 28, 2023

(65) Prior Publication Data

US 2023/0368632 A1 Nov. 16, 2023

(30) Foreign Application Priority Data

Jun. 27, 2023 (CN) .......................... 202310765316.9

(51) Int. Cl.
  *G08B 21/16* (2006.01)
  *G16Y 10/35* (2020.01)
  *G16Y 40/10* (2020.01)

(52) U.S. Cl.
  CPC .............. *G08B 21/16* (2013.01); *G16Y 10/35* (2020.01); *G16Y 40/10* (2020.01)

(58) Field of Classification Search
  CPC .......... G08B 21/16; G16Y 40/10; G16Y 10/35
  USPC ........................................................... 340/632
  See application file for complete search history.

(56) References Cited

U.S. PATENT DOCUMENTS

| 10,948,471 B1 | 3/2021 | MacMullin et al. |
| 2023/0368632 A1* | 11/2023 | Shao ....................... G01M 3/22 |

FOREIGN PATENT DOCUMENTS

| CN | 107965674 A |   | 4/2018 |
| CN | 109780452 A |   | 5/2019 |
| CN | 111523244 A |   | 8/2020 |
| CN | 113239745 A |   | 8/2021 |
| CN | 114548311 A |   | 5/2022 |
| CN | 115539846 A | * | 12/2022 |
| CN | 115587640 A |   | 1/2023 |
| CN | 116011740 A |   | 4/2023 |
| CN | 116308965 A |   | 6/2023 |

(Continued)

OTHER PUBLICATIONS

Fuel gas management based on internet of things system (Year: 2023).*

(Continued)

*Primary Examiner* — Kam Wan Ma
(74) *Attorney, Agent, or Firm* — METIS IP LLC (57) ABSTRACT

The embodiments of the present disclosure provide a method, an Internet of Things system and a storage medium for gas leakage inspection, the method is realized based on a smart gas management platform of the Internet of Things system for gas leakage inspection, including: obtaining monitoring data at different locations by controlling a drive module to drive a gas leakage inspection device to move based on monitoring data and distance data, and determining a first inspection scheme based on the monitoring data at different locations.

8 Claims, 4 Drawing Sheets

(56) References Cited

FOREIGN PATENT DOCUMENTS

| | | | | |
|---|---|---|---|---|
| CN | 116629580 A | * | 8/2023 | |
| CN | 116503975 B | * | 9/2023 | ......... G01C 21/3476 |

OTHER PUBLICATIONS

Method for disposing potential hazard safety based on internet of things system (Year: 2023).*
Inspection method for gas leakage monitoring (Year: 2022).*
Decision to Grant a Patent in Chinese Application No. 202310765316.9 mailed on Aug. 31, 2023, 5 pages.
First Office Action in Chinese Application No. 202310765316.9 mailed on Aug. 1, 2023, 29 pages.
Zhang, Xiaojun et al., A Gas/Odor Source Localization Strategy for Mobile Robot Based on Animal Predatory Behavior, Robot, 30(3): 268-272, 2008.
Chen, Yinsheng et al., Design and Implementation of Multi-robot System Searching for Hazardous Gas Leakage Source, Chinese Journal of Sensors and Actuators, 31(7): 1132-1140, 2018.
Liu, Zekun, Research on Leak Detection and Location of Gas Pipeline Based on Stacked AutoEncoders, Wanfang Data, 2021, 72 pages.
Tom Duckett et al., Learning to locate an odour source with a mobile robot, Proceedings of the 2001 IEEE International Conference on Robotics and Automation, 4017-4022, 2001.

* cited by examiner

FIG. 4

METHODS, INTERNET OF THINGS SYSTEMS, AND STORAGE MEDIA FOR SMART GAS PIPELINE NETWORK INSPECTION

CROSS-REFERENCE TO RELATED APPLICATION

This application claims priority of Chinese Patent Application No. 202310765316.9, filed on Jun. 27, 2023, the entire contents of which are incorporated herein by reference.

TECHNICAL FIELD

The present disclosure relates to the field of Internet of Things technology, and in particular, to a method, an Internet of Things system, and a storage medium for smart gas pipeline network inspection.

BACKGROUND

In the context of rapid urbanization, the demand for gas use is increasing and the mileage of gas pipeline networks is growing rapidly. In order to avoid gas leaks in the gas pipeline network, regular inspections need to be arranged to eliminate the safety risks of gas leaks in a timely manner, which is labor-intensive.

Therefore, it is necessary to provide a smart gas pipeline network inspection method, an Internet of Things system and a storage medium for monitoring the gas pipeline network, detecting gas leaks in a timely manner and eliminating safety hazards.

SUMMARY

One or more embodiments of the present disclosure provide a method for gas leak inspection, wherein the method is implemented based on a smart gas management platform of an Internet of Things system for gas leak inspection, including: obtaining, based on monitoring data and distance data, monitoring data at different locations by controlling a drive module to drive a gas leakage inspection device to move; and determining a first inspection scheme based on the monitoring data at different locations.

One or more embodiments of the present disclosure provide an Internet of Things system for gas leak inspection, wherein the Internet of Things system includes a smart gas object platform, a smart gas sensor network platform, a smart gas management platform, a smart gas service platform, and a smart gas user platform; the smart gas object platform is used to obtain monitoring data at different locations; the smart gas sensor network platform is used to upload the monitoring data at different locations to the smart gas management platform; the smart gas management platform is used to determine a first inspection scheme based on the monitoring data at different locations; the smart gas service platform is used to send the first inspection scheme to the smart gas user platform; and the smart gas user platform is used to display the first inspection scheme to a user.

One or more embodiments of the present disclosure provide a non-transitory computer-readable storage medium storing computer instructions, and when reading the computer instructions stored in the storage medium, a computer executes the method for gas leakage inspection as described in any one of the above embodiments.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "device," "unit," and/or "module" used herein are one method to distinguish different components, elements, parts, sections, or assemblies of different levels in ascending order. However, the terms may be displaced by other expressions if they may achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

Some embodiments of the present disclosure provide a gas leakage inspection device, which may include a combustible gas detection component, a wind direction and speed sensor, a sound monitoring component, an ultrasonic ranging component, a wireless charging module, and a drive module.

The combustible gas detection component may be used to obtain a combustible gas concentration. The combustible gas detection component may communicate with a smart gas management platform and may send an obtained combustible gas concentration to the smart gas management platform through a smart gas sensor network platform.

The wind direction and speed sensor may be used to obtain a wind direction and wind speed. The wind direction and speed sensor may communicate with the smart gas management platform and may send an obtained wind direction and wind speed to the smart gas management platform through the smart gas sensor network platform.

The sound monitoring component may be used to obtain data related to a sound, such as picking up an abnormal sound. The sound monitoring component may include a microphone, a pickup, and other components. The sound monitoring component may communicate with the smart gas management platform and send an obtained abnormal sound obtained through the smart gas sensor network platform to the smart gas management platform.

The ultrasonic ranging component may be used to obtain distance data between the gas leakage inspection device and an obstacle, and the obstacle may include but not is limited to a wall or vehicle.

The wireless charging module may be configured to provide electric energy for the gas leakage inspection device.

The drive module may be configured to drive the gas leakage inspection device to move.

In some embodiments, the gas leakage inspection device may further include at least one separate early warning component.

The separate early warning component may be used to warn or prompt a user. In some embodiments, the separate early warning component may be separated from or combined with the gas leakage inspection device.

Figure 2:
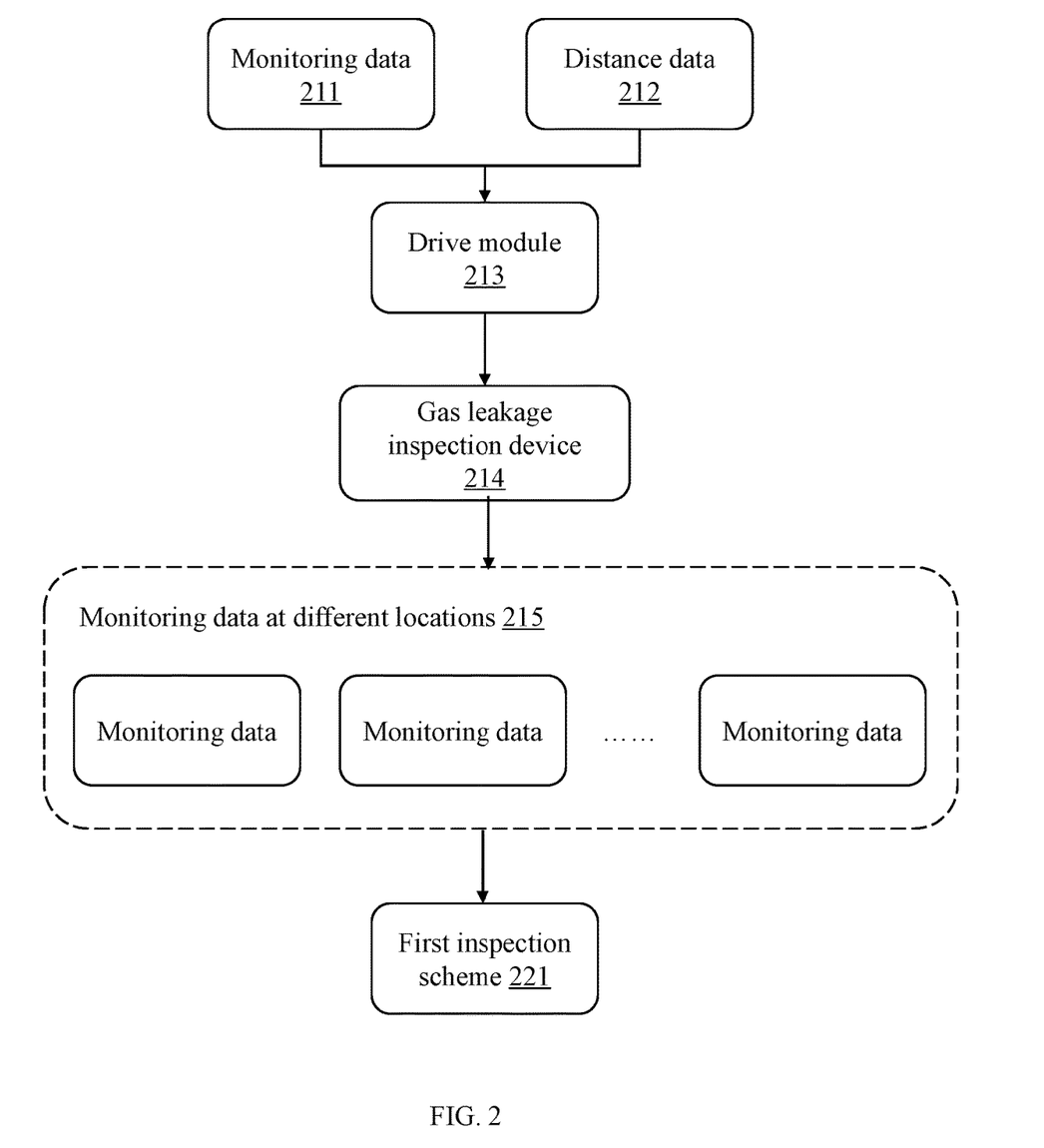
FIG. 2 is a schematic diagram illustrating an exemplary method for gas leak inspection according to some embodiments of the present disclosure.

For more information about the combustible gas concentration and the abnormal sound, please refer to FIG. 2 and its related descriptions.

In some embodiments, the gas leakage inspection device may upload obtained monitoring data and other information to an Internet of Things system for gas leakage inspection. The Internet of Things system for gas leakage inspection may issue a control instruction to the gas leakage inspection device to control a movement and inspection of the gas leakage inspection device.

Figure 1:
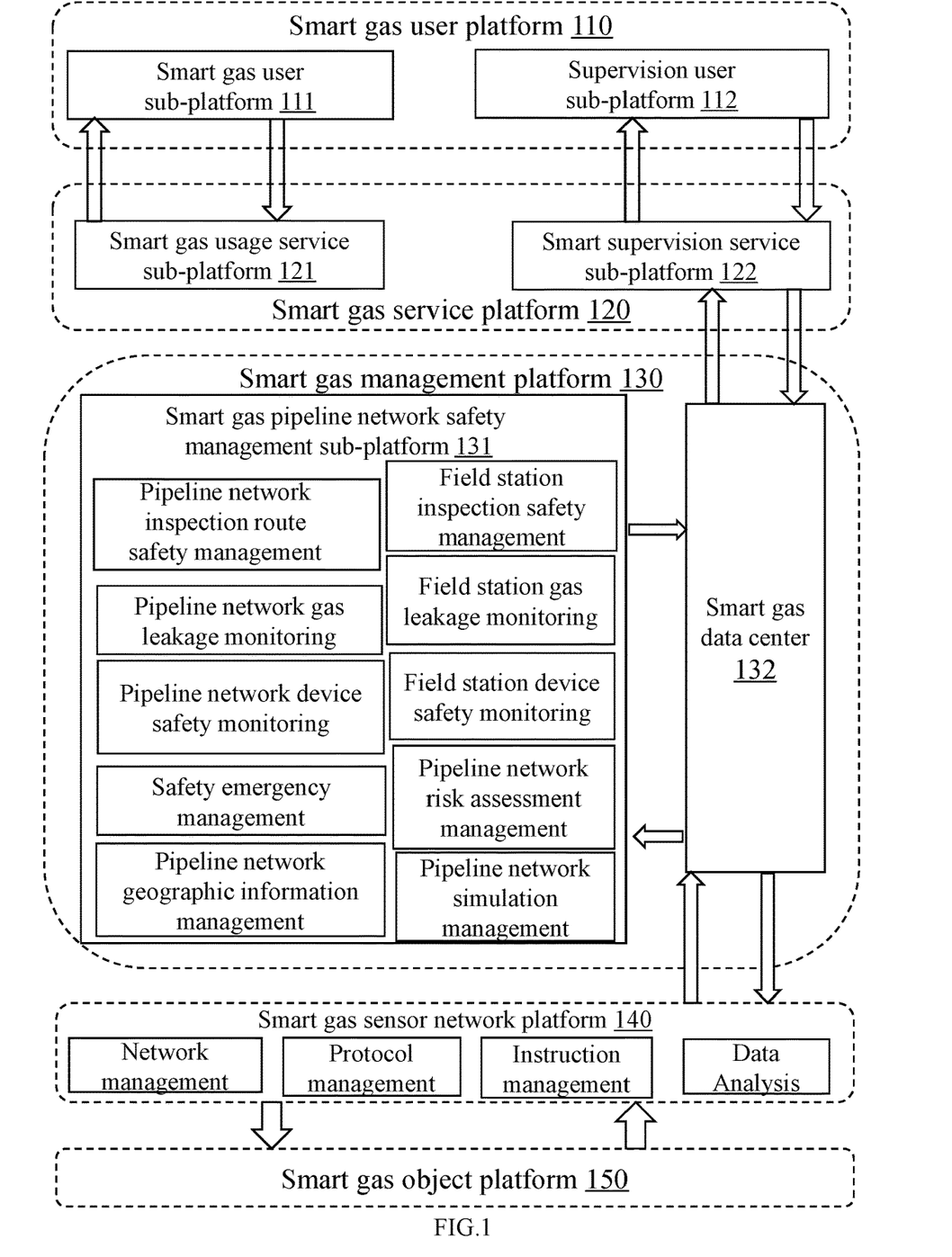
FIG. 1 is a schematic diagram illustrating a structure of an Internet of Things system for gas leak inspection according to some embodiments of the present disclosure.

FIG. 1 is a schematic diagram illustrating an exemplary structure of an Internet of Things system for gas leak inspection according to some embodiments of the present disclosure. As shown in FIG. 1, an Internet of Things system 100 may include a smart gas user platform 110, a smart gas service platform 120, a smart gas management platform 130, a smart gas sensor network platform 140, and a smart gas object platform 150 connected in sequence.

The smart gas user platform 110 may be a platform for interacting with a user. In some embodiments, the user platform 110 may be configured as a terminal device.

In some embodiments, the smart gas user platform 110 may include a gas user sub-platform 111 and a supervision user sub-platform 112.

The gas user sub-platform 111 may be a platform that provides a gas user with data related to gas usage and a solution to a gas problem. The gas user may include an industrial gas user, a commercial gas user, a general gas user, etc.

The supervision user sub-platform 112 may be a platform for supervising an operation of the entire Internet of Things system by a supervision user. The supervision user may include personnel from a security management department, etc.

In some embodiments, the smart gas user platform 110 may send early warning information, etc., to the supervision user based on the supervision user sub-platform 112.

The smart gas service platform 120 may be a platform configured to communicate the user's needs and control information. In some embodiments, the smart gas service platform 120 may obtain early warning information, etc., from the smart gas management platform 130 (e.g., a smart gas data center 132) and send the early warning information to the supervision user sub-platform 112.

In some embodiments, the smart gas service platform 120 may include a smart gas usage service sub-platform 121 and a smart supervision service sub-platform 122.

The smart gas usage service sub-platform 121 may be a platform that provides a gas service for the gas user. The smart supervision service sub-platform 122 may be a platform that satisfies a supervision need of the supervision user.

In some embodiments, the smart gas service platform 120 may send the early warning information, etc., to the supervision user sub-platform 112 based on the smart supervision service sub-platform 122.

The smart gas management platform 130 may act as a platform for coordinating and coordinating the connection and cooperation among various functional platforms, and gathering all the information of the Internet of Things, and providing perception management and control management functions for the operation system of the Internet of Things.

In some embodiments, the smart gas management platform 130 may include a smart gas pipeline network safety management sub-platform 131 and the smart gas data center 132.

The smart gas pipeline network safety management sub-platform 131 may be configured to monitor a risk of gas leakage in a gas pipeline network and provide an early warning alert. In some embodiments, the smart gas pipeline network safety management sub-platform may include, but is not limited to, pipeline network inspection safety management, pipeline network gas leakage monitoring, pipeline network device safety monitoring, safety emergency management, pipeline network geographic information management, field station inspection safety management, field station gas leakage monitoring, field station device safety monitoring, pipeline network risk assessment management, and pipeline network simulation management.

The smart gas data center 132 may be used to store operational information related to the Internet of Things system 100. In some embodiments, the smart gas data center 132 may be configured as a storage device for storing data related to the gas leakage, for example, the monitoring data.

In some embodiments, the smart gas management platform 130 may interact with the smart gas service platform 120 and the smart gas sensor network platform 140 through the smart gas data center 132, respectively. For example, the smart gas data center 132 may send the early warning information to the smart gas service platform 120. As another example, the smart gas data center 132 may send an instruction to the smart gas sensor network platform 140 to obtain the monitoring data.

The smart gas sensor network platform 140 may be a functional platform for managing sensor communication. In some embodiments, the smart gas sensor network platform 140 may realize functions of sensing information sensor communication and control information sensor communication.

In some embodiments, the smart gas sensor network platform 140 may include network management, protocol management, instruction management, and data analysis. The smart gas sensor network platform 140 may be used to obtain operating information of a gas household device and a gas pipeline network device.

The smart gas object platform 150 may be a functional platform for generating the sensing information and executing the control information. For example, the smart gas object platform 150 may monitor and generate the operation information of the gas household device and the gas pipeline network device.

In some embodiments of the present disclosure, the Internet of Things system 100 for gas leakage inspection may form a closed loop of information operation between the smart gas object platform and the smart gas user platform, and operate in a coordinated and regular manner under the unified management of the smart gas management platform to realize the intellectualization and informatization of gas pipeline monitoring, early warning, and remote management.

FIG. 2 is a schematic diagram illustrating an exemplary method for gas leak inspection according to some embodiments of the present disclosure.

In some embodiments, a process for determining a first inspection scheme may include the following steps performed by a smart gas management platform of an Internet of Things system for gas leakage inspection:

Step 210, obtaining, based on monitoring data 211 and distance data 212, monitoring data at different locations 215 by controlling a drive module 213 to drive a gas leakage inspection device 214 to move.

More about the drive module 213 and the gas leakage inspection device 214 can be found in the previous relevant description.

The monitoring data 211 refers to data obtained by the gas leakage inspection device related to gas or a wind direction. For example, the monitoring data may include at least one of a combustible gas concentration, a wind direction and speed, or an abnormal sound.

The combustible gas concentration refers to a concentration of a combustible gas in the air.

The abnormal sound is a sound used to reflect a gas leakage and a magnitude of the sound. For example, the abnormal sound may include, but is not limited to, a vibration sound of a gas pipeline, a gas leakage sound, and a magnitude of the sound. In some embodiments, the abnormal sound may be preset sound data. For example, the abnormal sound may include sound data within a preset frequency range and a preset loudness range.

In some embodiments, the smart gas management platform may obtain the combustible gas concentration based on a combustible gas detection component, obtain the wind direction and speed based on a wind direction and speed sensor, and obtain the abnormal sound based on a sound monitoring component. More information about the combustible gas detection component, wind direction and speed sensor, and sound monitoring component can be found in the previous descriptions.

The distance data 212 is data related to a distance between the gas leakage inspection device and an obstacle. The smart gas management platform may obtain the distance data through an ultrasonic ranging component. More about the ultrasonic ranging component can be found in the previous related description.

The smart gas management platform may generate a movement control instruction based on the monitoring data and distance data and send the movement control instruction to the drive module to drive the gas leakage inspection device to move through a smart gas sensor network platform. For example, the smart gas management platform may control the drive module to drive the gas leakage inspection device to decelerate and avoid an obstacle based on a moving speed and distance data of the gas leakage inspection device.

In some embodiments, the gas leakage inspection device may obtain the monitoring data at different locations 215 during its movement through the combustible gas detection component, wind direction and speed sensor, and sound monitoring component.

In some embodiments, the monitoring data at different locations may include a wind direction change degree at the different locations.

The wind direction change degree is a parameter used to measure a degree of change in the angle of the wind direction.

Step 220, determining a first inspection scheme 221 based on the monitoring data at different locations 215.

The first inspection scheme 221 refers to a scheme related to an inspection route of the gas leakage inspection device.

In some embodiments, the smart gas management platform may determine the first inspection scheme based on the monitoring data at different locations in various ways. For example, the smart gas management platform may use a first preset data comparison table to determine the first inspection scheme based on the monitoring data at different locations. The first preset data comparison table records an inspection scheme corresponding to the monitoring data at different locations. The first preset data comparison table may be set in advance based on prior knowledge or historical data.

It should be understood that there are locations in a gas pipeline network that are more prone to gas leakage or are suitable for obtaining more accurate monitoring data. To ensure the quality of inspection, the locations may be designated as necessary inspection points, and the gas leakage inspection device needs to perform a necessary safety inspection on the locations.

In some embodiments, the smart gas management platform may determine a necessary inspection scheme based on target area information, and control the drive module to drive the gas leakage inspection device to move based on the necessary inspection scheme.

The target area information refers to information related to a target area. For example, the target area information may include, but is not limited to, an acreage of the target area and a distribution of gas pipeline devices in the target area.

The target area refers to an area where the gas leakage inspection device needs to perform a gas inspection.

The smart gas management platform may obtain the target area information by accessing a gas data center.

The necessary inspection scheme refers to an inspection scheme that the gas leakage inspection device need complete. The necessary inspection scheme may include at least one necessary inspection point and an inspection route of the necessary inspection point.

The necessary inspection point refers to a location point that the gas leakage inspection device need to inspect. For example, the necessary inspection point may include, but is not limited to, a valve location, a gas pipeline interface location, and a gas device operating location.

In some embodiments, the smart gas management platform may determine the necessary inspection scheme in different ways based on the target area information. For example, the smart gas management platform may identify at least one location (e.g., the gas pipeline interface location and the valve location) where the gas leakage may occur based on the target area information, designate the at least one location as the necessary inspection point, and generate the necessary inspection scheme based on the at least one necessary inspection point.

In some embodiments, the smart gas management platform may also access the gas data center, designate a location where a count of the gas leakage has occurred in a historical time period (e.g., during the past year) exceeds a preset count of gas leakage designate the location as the necessary inspection point, and generate the necessary inspection scheme based on the necessary inspection point. The preset count of gas leakage may be an empirical value, a preset value, etc.

The smart gas management platform may designate a connection line formed by connecting two nearest necessary inspection points as the inspection route if there are no other obstacles on the connection line based on necessary inspection points.

The smart gas management platform may generate a necessary inspection movement instruction and send the necessary inspection movement instruction to the drive module to control the gas leakage inspection device to move based on the necessary inspection scheme.

In some embodiments of the present disclosure, the smart gas service platform utilizes historical data from the smart gas data center or information about the target area to identify the location where the gas leakage is likely to occur. Then the identified location is designated as the necessary inspection point, and the necessary inspection scheme is generated. This ensures that all locations prone to the gas leakage are inspected, and any safety hazards can be promptly addressed.

In some embodiments of the present disclosure, the smart gas service platform may determine the first inspection scheme and control the gas leakage inspection device to perform an automatic inspection on the gas pipeline network based on the monitoring data at different locations, realizing effective monitoring the gas pipeline network and ensuring a timely elimination of a safety hazard.

In some embodiments, the smart gas service platform may determine a second inspection scheme based on the monitoring data and the distance data in response to a combustible gas concentration being greater than a first concentration threshold. Furthermore, the smart gas management platform may control the gas leakage inspection device to release at least one separate early warning component and control the at least one separate early warning component to turn on an alarm mode in response to the combustible gas concentration being greater than a second concentration threshold. More information about the combustible gas concentration and the separate early warning component can be found in the preceding description.

The first concentration threshold refers to a threshold associated with a concentration of a combustible gas within a preset range of a combustible gas source. The second concentration threshold refers to a threshold associated with a combustible gas concentration at a location of the combustible gas source. The first concentration threshold and the second concentration threshold may be pre-set values or default values, wherein the second concentration threshold is higher than the first concentration threshold. In some embodiments, the first concentration threshold may be a threshold that meets a leakage determination criterion, and the second concentration threshold may be a concentration threshold of a gas near the combustible gas source.

The combustible gas source refers to a gas source from which the gas leakage may occur.

The second inspection scheme refers to a plan associated with an updated inspection route of the gas leakage inspection device.

When the combustible gas concentration obtained by the gas leakage inspection device exceeds the first concentration threshold, it suggests a possible combustible gas source near an upwind vent. The gas leakage inspection device may update a movement azimuth and a movement route based on the monitoring data and the distance data obtained at different locations during its movement to accurately reach the combustible gas source.

In some embodiments, the smart gas service platform may determine the second inspection scheme in various ways based on monitoring data and distance data. For example, it may determine the wind direction as the updated movement azimuth and generate the second inspection scheme accordingly. It may also generate the second inspection scheme by generating an obstacle avoidance route based on the distance data between the gas leakage inspection device and the obstacle.

In some embodiments, the smart gas service platform may estimate suspicious positioning data of the combustible source gas by processing at least one set of monitoring data through a gas source model. The second inspection scheme is determined based on the suspected positioning data. Further information can be found in FIG. 3 and its related description.

There are various alarm modes, such as an audible alarm and a light alarm.

When the gas concentration obtained by the gas leakage inspection device is greater than the second concentration threshold, it indicates that the gas leakage inspection device has reached near the combustible gas source. In some embodiments, in response to the combustible gas concentration being greater than the second concentration threshold, the smart gas service platform may generate a separate alarm control instruction and send the instruction to the at least one separate early warning component, then control the at least one separate early warning component to be separated and released to a location of the gas leakage inspection device, and turn on the alarm mode.

In some embodiments of the present disclosure, when the combustible gas concentration exceeds the first concentration threshold, it signifies a higher combustible gas concentration near the gas leakage inspection device, indicating a potential gas leakage source nearby. The wind direction is determined as the updated movement direction, driving the gas leakage inspection device to move towards an upwind direction, enabling a quicker and more accurate identification of the combustible gas source. When the combustible gas concentration exceeds the second concentration threshold, it indicates the proximity of the combustible gas source to the gas leakage inspection device. By deploying the separate early warning component at that location and activating its alarm mode, nearby personnel on duty can promptly receive the alarm information, enhancing the efficiency of the alarm.

Figure 3:
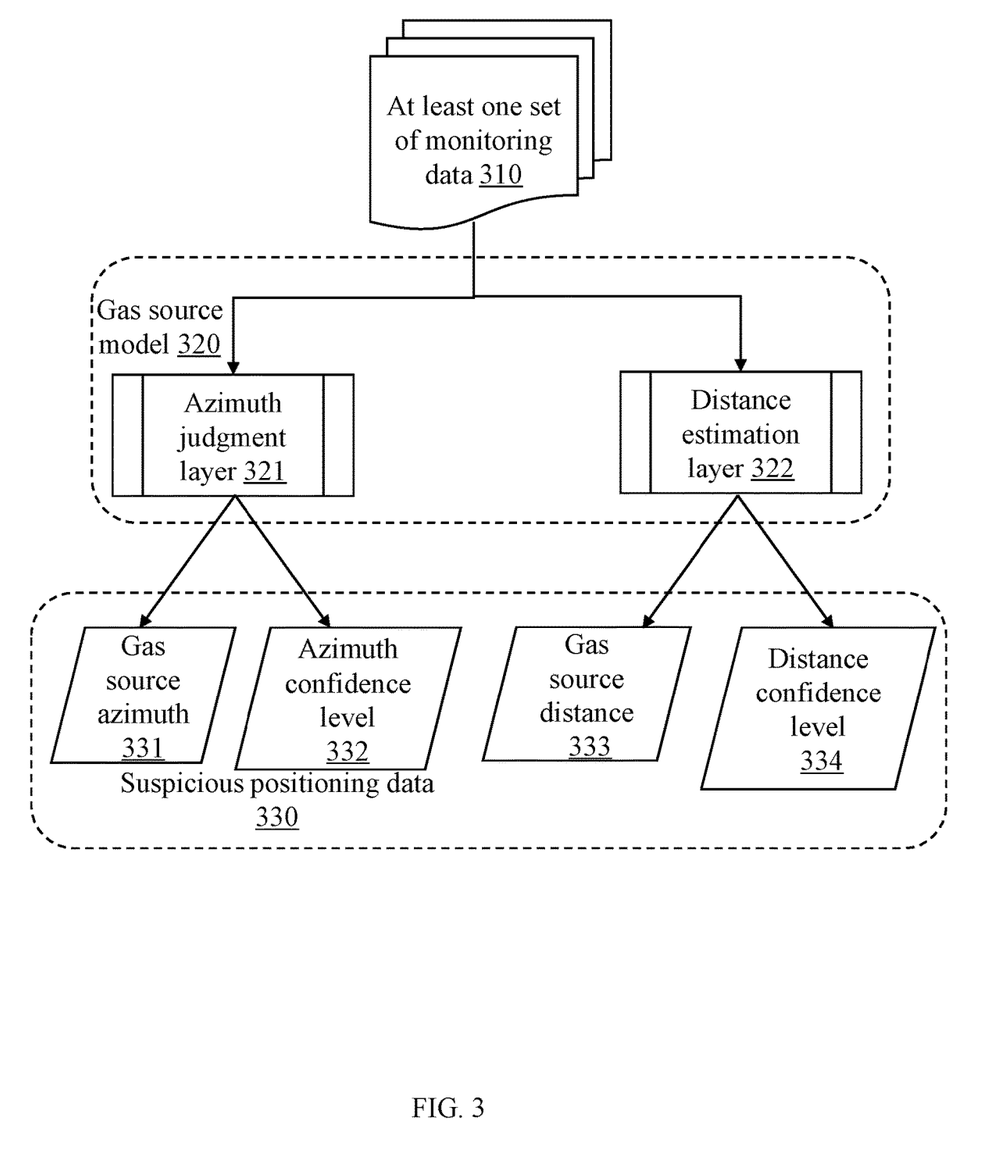
FIG. 3 is a schematic diagram illustrating an exemplary gas source model according to some embodiments of the present disclosure.

FIG. 3 is a schematic diagram illustrating an exemplary gas source model according to some embodiments of the present disclosure.

The gas source model may be a machine learning model used to determine suspicious positioning data. The gas source model may include a deep neural network (DNN) model, etc.

In some embodiments, an input of a gas source model 320 may include at least one set of monitoring data 310. An output may include suspicious positioning data 330 of a combustible gas source. More about the monitoring data and combustible gas source can be found in FIG. 2 and its related description.

The suspicious positioning data refers to data related to a location of the combustible gas source. For example, the suspicious positioning data may include but is not limited to, a gas source azimuth, a gas source distance, etc. In some embodiments, the suspicious positioning data may be time-based sequence data. For example, the suspicious positioning data may include gas source azimuths, gas source distances, etc., at a plurality of moments.

The gas source azimuth refers to a horizontal angle of the combustible gas source relative to the front of the gas leakage inspection device. For example, the gas source azimuth may be a horizontal angle of 20° north by east for the combustible gas source relative to the front of the gas leakage inspection device.

The gas source distance is a distance between the gas leakage inspection device and the combustible gas source.

In some embodiments, the gas source model 320 may include an azimuth judgment layer 321 and a distance estimation layer 322.

The azimuth judgment layer may be a machine learning model for determining the gas source azimuth and an azimuth confidence level. The azimuth judgment layer may include a deep neural network model, etc.

In some embodiments, an input to the azimuth judgment layer 321 may include the at least one set of monitoring data 310; and an output may include a gas source azimuth 331 and an azimuth confidence level 332.

The azimuth confidence level is a parameter used to assess the azimuthal accuracy of the gas source. The azimuth confidence level may be expressed as a real number, and the larger the number, the higher the accuracy of the gas source azimuth.

In some embodiments, the count of sets of the monitoring data input in the azimuth judgment layer may be related to the size or the variation range of data in the monitoring data. For example, when the combustible gas concentration in the monitoring data is small (e.g., less than a third concentration threshold), the count of sets of the monitoring data input in the azimuth judgment layer may be increased. As another example, if the combustible gas concentration in the monitoring data has a large variation range (e.g., greater than a range threshold), the count of sets of the monitoring data input in the azimuth judgment layer may be reduced.

When the monitoring data is small, increasing the count of sets of input monitoring data and enriching the amount of data can help to improve the accuracy of the output gas source azimuth and azimuth confidence level. When the monitoring data has a large variation range, reducing the count of sets of input monitoring data is helpful to reduce the calculation volume and shorten the calculation time.

The distance estimation layer may be a machine learning model for determining the distance to the gas source. The distance estimation layer may include a deep neural network model, etc.

In some embodiments, an input of the distance estimation layer 322 may include the at least one set of monitoring data 310. An output may include a gas source distance 333 and a distance confidence level 334.

The distance confidence level is a parameter used to assess the accuracy of the gas source distance. The distance confidence level may be expressed as a real number, and the larger the number, the higher the accuracy of the gas source distance.

In some embodiments of the present disclosure, the gas source azimuth and the azimuth confidence level are determined using the azimuth judgment layer, and the gas source distance and the distance confidence level are determined using the distance estimation layer. Using different layers to determine the gas source azimuth and the gas source distance respectively is conducive to improving the accuracy of the determined gas source azimuth and the gas source distance.

In some embodiments, the azimuth judgment layer 321 may be obtained by training based on a plurality of first training samples with a first label. The distance estimation layer 322 may be obtained by training based on a plurality of second training samples with a second label.

In some embodiments, the first training sample may include at least one set of sample monitoring data, and the first label may include a sample gas source azimuth e corresponding to the first training sample. The second training sample may include at least one set of sample monitoring data, and the second label may include a sample gas source distance corresponding to the second training sample.

In some embodiments, the first training sample and the second training sample may be obtained based on historical data (e.g., historical monitoring data), and the first label and the second label may be determined based on simulations of historical data performed by simulation software.

In some embodiments, the smart gas management platform may determine a second inspection scheme based on suspicious positioning data. For example, the smart gas management platform may determine the gas source azimuth as the movement azimuth and the gas source distance as the movement distance based on the suspicious positioning data to generate the second inspection scheme. The movement azimuth is a horizontal angle of the moving direction of the gas leakage inspection device relative to the front of the gas leakage inspection device. More about the second inspection scheme can be found in FIG. 2 and its related description.

In some embodiments of the present disclosure, at least one set of monitoring data is processed by the gas source model to determine the suspicious positioning data, which can simultaneously consider the influence of multiple factors, making the determination of suspicious positioning data more efficient and accurate and avoiding errors in manual determination.

In some embodiments, in response to a variation range of at least one type of the monitoring data exceeding a preset range threshold, the smart gas management platform may process the monitoring data through the gas source model again to estimate the updated suspicious positioning data.

The preset range threshold may be a preset value, an empirical value, etc.

In some embodiments, the smart gas management platform may estimate the updated suspicious positioning data in a variety of ways. For example, the smart gas management platform may calculate the updated gas source azimuth using the formula of $a=a_1*x_1+a_2*x_2$, where a represents the updated gas source azimuth, $a_1$ corresponds to a first gas source azimuth predicted based on the monitoring data at time $t_1$, $x_1$ is a weight associated with the first gas source azimuth. Similarly, $a_2$ represents a second gas source azimuth predicted based on the monitoring data at time $t_2$, and $x_2$ is a weight associated with the second gas source azimuth. The first weight may be calculated using the formula of $x_1=[b_1/(b_1+b_2)+m_1]*q$, where $x_1$ represents the first weight corresponding to the first gas source azimuth, $b_1$ represents the size of the data in the monitoring data at time $t_1$ (e.g., size magnitude of combustible gas concentration), $b_2$ represents the size of the data in the monitoring data at time $t_2$, $m_1$ represents a first azimuth confidence level corresponding to the first gas source azimuth, and q represents a normalization factor (e.g., a preset value). Similarly, the second weight may be calculated using the formula of $x_2=[b_2/(b_1+b_2)+m_2]*q$, wherein $x_2$ represents the second weight corresponding to the second gas source azimuth, and $m_2$ represents a second azimuth confidence level corresponding to the second gas source azimuth. The smart gas management platform determines the updated gas source distance in a manner similar to how it determines the updated gas source azimuth.

Through conducting real-time analysis of the monitoring data collected during the movement of the gas leakage inspection device, when one type of the data shows a significant variation range, the updated suspicious positioning data is re-estimated. The weights are then assigned, favoring the direction of more pronounced variation in the monitoring data and the prediction results with higher confidence levels. This approach enhances the accuracy of the updated suspicious positioning data, enabling the gas leakage inspection device to precisely reach potential locations of gas leakage.

In some embodiments, in response to the combustible gas concentration less than a first concentration threshold, the updated movement azimuth is determined based on the wind direction and speed and the necessary inspection scheme. More about the first concentration threshold and the necessary inspection scheme can be found in FIG. 2 and its related description.

In some embodiments, the smart gas management platform may determine the updated movement azimuth based on the wind direction and speed and necessary inspection scheme in a variety of ways. For example, the smart gas management platform may calculate the updated movement azimuth by the formula of $c=d*f+g*h$, where c is the updated movement azimuth; d is the azimuth of the necessary inspection point nearest to the gas leakage inspection device relative to the gas leakage inspection device; f is the weight of the necessary inspection point; g is the azimuth of the wind direction relative to the gas leak detection device; and h is the weight of the wind direction. The weight f of the necessary inspection point and the weight h of the wind direction may be preset values, etc. In some embodiments, the azimuth is negative when the azimuth is clockwise relative to the gas leakage inspection device; and the azimuth is positive when the azimuth is counterclockwise relative to the gas leak detection device.

Understandably, when the combustible gas concentration obtained by the gas leakage inspection device is lower than the first concentration threshold, it indicates that there is no gas leakage at an upwind vent. The smart gas management platform controls the gas leakage inspection device to move towards the necessary inspection point while also aiming to move in the downwind direction, ensuring not only inspection efficiency but also a more comprehensive inspection, thereby minimizing the risk of missed inspection.

Figure 4:
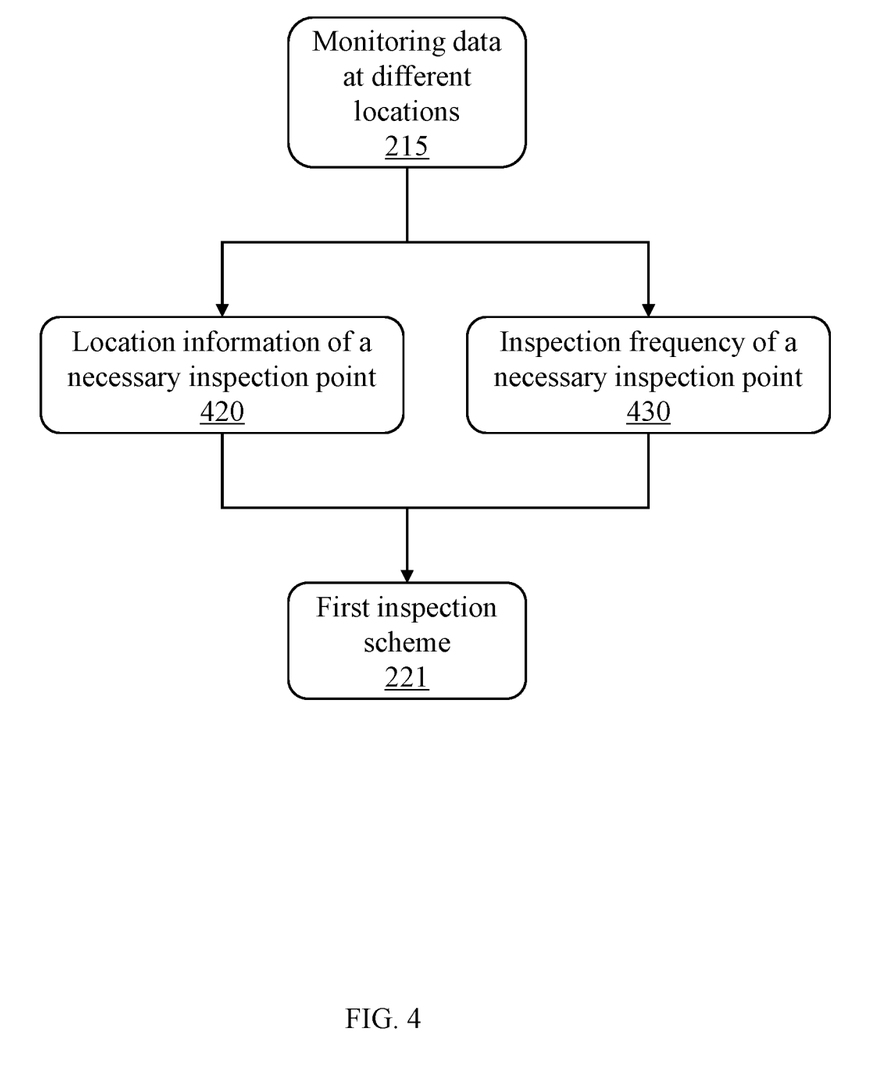
FIG. 4 is a schematic diagram illustrating an exemplary process for determining a first inspection scheme according to some embodiments of the present disclosure.

FIG. 4 is a schematic diagram illustrating an exemplary process for determining a first inspection scheme according to some embodiments of the present disclosure.

In some embodiments, the smart gas management platform may determine location information of a necessary inspection point 420 and an inspection frequency of a necessary inspection point 430 based on the monitoring data at different locations 215; and determine the first inspection scheme 221 based on the location information and inspection frequency. More about the first inspection scheme can be found in FIG. 2 and its related description.

The location information of the necessary inspection point may be expressed in the form of coordinates. More about the necessary inspection points can be found in FIG. 2 and its related description.

The smart gas management platform may obtain the location information of the necessary inspection point by accessing the smart gas data center. In some embodiments, the smart gas management platform may also determine a combustible gas source and its suspicious positioning data as a necessary inspection point and its corresponding location information based on the monitoring data at different locations. More about the combustible gas source may be found in FIG. 2 and its related description. More about the suspicious positioning data may be found in FIG. 3 and its related description.

In some embodiments, the smart gas management platform may judge whether a count of times that a wind direction change degree of a location to be measured exceeds a wind direction change threshold within a unit time is greater than a count threshold; and in response to the count of times being greater than the count threshold, determine the location to be measured as the necessary inspection point. More about the wind direction change degree can be found in FIG. 2 and its related description.

The wind direction change threshold may be a preset value, a default value, etc.

The wind direction change degree of the location to be measured is large, indicating that the location to be measured may be a location of the convergence of airflow, which may be used as a necessary inspection point to collect a wider range of combustible gas concentration in the air, which is conducive to improving the quality of the inspection.

The inspection frequency of the necessary inspection point is a count of inspections of the necessary inspection point within a preset time period. The inspection frequency may be expressed in the form of a vector. For example, the inspection frequency may be expressed as $[(A_1, n_1), (A_2, n_2), (A_3, n_3)]$, i.e., the inspection frequency of the necessary inspection point $A_1$ is $n_1$; the inspection frequency of the necessary inspection point $A_2$ is $n_2$; and the inspection frequency of the necessary inspection point $A_3$ is $n_3$.

In some embodiments, the smart gas management platform may determine the inspection frequency of the necessary inspection point based on the monitoring data at different locations in a variety of ways. For example, the smart gas management platform may construct a target vector based on the monitoring data at different locations; determine an associated vector through the vector database based on the target vector; and determine a reference inspection frequency corresponding to the associated vector as the inspection frequency corresponding to the target vector.

The target vector is a vector constructed based on the monitoring data at different locations. There may be various ways to construct the target vector. For example, the smart gas management platform may input the monitoring data at different locations into an embedding layer for processing to obtain the target vector. In some embodiments, the embedding layer may be obtained by joint training with an inspection frequency determination model.

The vector database contains a plurality of reference vectors, and a corresponding reference inspection frequency exists for each of the plurality of reference vectors.

The reference vector is a vector constructed based on the historical monitoring data at different locations in the historical time period, and the reference inspection frequency corresponding to the reference vector may be the historical inspection frequency corresponding to a case of better inspection effect in the historical time period. The reference vector may be constructed in the same way as the target vector above.

In some embodiments, the smart gas management platform may calculate the vector distance between the target vector and the reference vector, respectively, to determine the inspection frequency corresponding to the target vector. For example, the smart gas management platform designate a reference vector whose vector distance from the target vector satisfies a preset condition as the associated vector and a reference inspection frequency corresponding to the associated vector as the inspection frequency corresponding to the target vector. The preset condition may be set according to an actual situation. For example, the preset condition may be the vector distance minimum, the vector distance less than the distance threshold, etc. The vector distance may include, but is not limited to, a cosine distance, etc.

In some embodiments, the smart gas management platform may construct a necessary inspection map based on information related to the necessary inspection point; and determine the inspection frequency of the necessary inspection point by processing the necessary inspection map using the inspection frequency determination model.

The necessary inspection map is a knowledge map used to reflect the relevant information of necessary inspection points. The necessary inspection map may consist of a plurality of nodes and edges, where the nodes have node features and the edges have edge features.

In some embodiments, each node in the necessary inspection map corresponds to a necessary inspection point. The node features of a node may reflect the relevant features of the corresponding necessary inspection point. In some embodiments, the node features may include at least one of an inspection point type, historical monitoring data, historical maintenance data, and an initial inspection frequency.

The inspection point type is a category to which the necessary inspection points belong. For example, the inspection point type may include but not limited to a valve inspection point, a pipeline interface inspection point, a combustible gas source inspection point, an airflow convergence location inspection point, etc.

In some embodiments, the historical monitoring data may be weighted frequency distribution data. The frequency distribution may include the count of times that the combustible gas concentrations at different necessary inspection points exceed a standard concentration threshold during the historical time period. The weights may be determined based on the duration between the moment corresponding to the historical monitoring data and the present moment. For example, the closer the moment corresponding to the historical monitoring data is to the present moment, the higher the weight may be assigned. Merely by way of example, for the historical monitoring data, the count of times that the combustible gas concentration at the necessary inspection point A exceeds the standard concentration threshold in the past year is 8. There were 5 times taking place in the past year to the past six months with a corresponding weight of 0.5, 2 times taking place in the past six months to the past month with a weight of 0.8, and 1 time taking place in the past month with a weight of 1. The frequency of the necessary inspection point A may be calculated as 5.1 (5×0.5+2×0.8+1×1).

In some embodiments of the present disclosure, by correlating the weight of the historical monitoring data to the duration between the moment corresponding to the historical monitoring data and the present moment, the shorter the duration, the greater the weight of the historical monitoring data, which ensures the timeliness of the historical monitoring data and helps to improve the reliability of the subsequently determined inspection frequency.

In some embodiments, the initial inspection frequency may be determined based on the inspection point type of the necessary inspection points using a second preset data comparison table. The second preset data comparison table has recorded initial inspection frequencies corresponding to necessary inspection points of different inspection point types.

The plurality of nodes may be connected by edges, and the edge features may reflect a relationship between nodes that may include inspection routes between necessary inspection points. When there is a relationship between two nodes and there is no other node on the inspection route between these two nodes, they are connected by an edge.

In some embodiments, in the necessary inspection map, each edge between two nodes corresponds to the inspection route between necessary inspection points corresponding to the two nodes. The edge features may reflect the relevant features of the corresponding inspection route. In some embodiments, the edge features may include a distance of the inspection route.

In some embodiments, the edge features in the necessary inspection map may also include historical movement azimuth data. The historical movement azimuth may include all movement azimuths of the gas leakage inspection device during the historical time period. More description about the movement azimuth can be found in FIG. 3 and its related description.

In the historical inspection route, if the gas leakage inspection device changes the movement azimuth for many times to determine the necessary inspection point, it indicates that the wind direction of the area may be more confusing, the necessary inspection point is not easy to determine, then the inspection frequency may be appropriately increased.

In some embodiments, the edge features of the necessary inspection map may also include a count of inspection routes.

If there are a plurality of inspection routes between two necessary inspection points, it means that the wind direction of the area between these two necessary inspection points changes more frequently and not regularly, and the inspection is more difficult, then the inspection frequency may be increased appropriately.

The inspection frequency determination model may be a machine learning model used to determine the inspection frequency of the necessary inspection points. For example, the inspection frequency determination model may include a graph neural network (GNN) model.

In some embodiments, an input of the inspection frequency determination model may include the necessary inspection map. An output may include the inspection frequency corresponding to the necessary inspection point.

In some embodiments, the inspection frequency determination model may be obtained by training based on a plurality of third training samples with a third label.

In some embodiments, the third training sample may include a sample necessary inspection map, and the third label may include a sample inspection frequency of the sample necessary inspection point corresponding to the third training sample. In some embodiments, the third training sample and the third label may be obtained based on historical data (e.g., a historical necessary inspection map and a historical inspection frequency corresponding to a historical necessary inspection point).

In some embodiments of the present disclosure, the necessary inspection map is processed through the inspection frequency determination model to determine the inspection frequency corresponding to the necessary inspection points, which can simultaneously consider the influence of a variety of factors, so that the inspection frequency is determined efficiently and accurately and avoid the error of manual determination.

In some embodiments, the smart gas management platform may determine the first inspection scheme based on the location information and inspection frequency in a variety of ways. For example, the smart gas management platform may determine the first inspection scheme based on the location information and inspection frequency through a third preset data comparison table. The third preset data comparison table is recorded with different location information and the inspection frequency corresponding to the first inspection scheme.

In some embodiments of the present disclosure, the gas leakage inspection device determines the necessary inspection points and their inspection frequencies by processing and analyzing the monitoring data at different locations at different times, which helps to improve the accuracy of the determined necessary inspection points and inspection frequencies, thus ensuring the quality of inspection and avoiding safety hazards.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for smart gas pipeline network inspection, wherein the method is implemented based on a smart gas management platform of an Internet of Things system for smart gas pipeline network inspection, comprising:
    obtaining, based on first monitoring data and distance data, second monitoring data at different locations by controlling a drive module to drive a gas leakage inspection device to move, wherein the first monitoring data is obtained by the gas leakage inspection device, wherein the first monitoring data includes at least one of a combustible gas concentration, a wind direction and speed, and an abnormal sound, and the distance data is related to a distance between the gas leakage inspection device and an obstacle;
    determining a first inspection scheme based on the second monitoring data at different locations;
    in response to the combustible gas concentration being greater than a first concentration threshold, determining a second inspection scheme based on first monitoring data and the distance data, comprising:
        estimating suspicious positioning data of a combustible gas source by processing at least one set of the first monitoring data through a gas source model, the gas source model being a machine learning model, wherein the gas source model includes an azimuth judgment layer and a distance estimation layer, the azimuth judgment layer determines a gas source azimuth based on the at least one set of the first monitoring data, and the distance estimation layer determines a gas source distance based on the at least one set of the first monitoring data, and the suspicious positioning data is time-based sequence data;
        in response to a data variation range of the at least one set of the first monitoring data being greater than a preset amplitude threshold, estimating updated suspicious positioning data by processing the at least one set of the first monitoring data through the gas source model again; and
        determining the second inspection scheme based on the updated suspicious positioning data.

2. The method according to claim 1, wherein the gas leakage inspection device further includes at least one separate early warning component, and the method further includes:
    in response to the combustible gas concentration being greater than a second concentration threshold, controlling the gas leakage inspection device to release the at least one separate early warning component and controlling the at least one separate early warning component to turn on an alarm mode.

3. The method according to claim 1, wherein the determining a first inspection scheme based on the second monitoring data at different locations includes:
    determining, based on the second monitoring data at different locations, location information of a necessary inspection point and an inspection frequency of the necessary inspection point; and
    determining the first inspection scheme based on the location information and the inspection frequency.

4. The method according to claim 3, further comprising:
    constructing a necessary inspection map based on information related to the necessary inspection point, a node of the necessary inspection map corresponding to the necessary inspection point, and node features of the node including at least one of a necessary inspection point type, historical monitoring data, historical maintenance data, and an initial inspection frequency, an edge of the necessary inspection map corresponding to an inspection route between two nodes, and edge features of the edge at least including a movement distance; and
    determining the inspection frequency of the necessary inspection point by processing the necessary inspection map using an inspection frequency determination model, and the inspection frequency determination model being a machine learning model.

5. A non-transitory computer-readable storage medium storing computer instructions, and when reading the computer instructions stored in the storage medium, a computer executes a method for gas leakage inspection according to claim 1.

6. An Internet of Things system for smart gas pipeline network inspection, wherein the Internet of Things system includes a smart gas object platform, a smart gas sensor network platform, a smart gas management platform, a smart gas service platform, and a smart gas user platform;
    the smart gas object platform is used to obtain first monitoring data and distance data, and second monitoring data at different locations, wherein the first monitoring data include at least one of a combustible gas concentration, a wind direction and speed, and an abnormal sound, and the distance data is related to a distance between a gas leakage inspection device and an obstacle;
    the smart gas sensor network platform is used to upload the second monitoring data at different locations to the smart gas management platform;
    the smart gas management platform is used to determine a first inspection scheme based on the second monitoring data at different locations;
    the smart gas management platform is further used to:
        in response to the combustible gas concentration being greater than a first concentration threshold, determine a second inspection scheme based on the first monitoring data and the distance data, comprising:
            estimating suspicious positioning data of a combustible gas source by processing at least one set of the first monitoring data through a gas source model, the gas source model being a machine learning model, the gas source model including an azimuth judgment layer and a distance estimation layer, and the azimuth judgment layer determining a gas source azimuth based on the at least one set of the first monitoring data, and the distance estimation layer determining a gas source distance based the on at least one set of the first monitoring data, and the suspicious positioning data being time-based sequence data;
            in response to a data variation range of the at least one set of the first monitoring data being greater than a preset amplitude threshold, estimating updated suspicious positioning data by processing the at least one set of the first monitoring data through the gas source model again; and determining the second inspection scheme based on the updated suspicious positioning data;
the smart gas service platform is used to send the first inspection scheme to the smart gas user platform; and
the smart gas user platform is used to display the first inspection scheme to a user.

7. The Internet of Things system according to claim 6, wherein the smart gas object platform includes the gas leakage inspection device, and the gas leakage inspection device includes a combustible gas detection component, a wind direction and speed sensor, a sound monitoring component, an ultrasonic ranging component, a wireless charging module, and a drive module; wherein
the ultrasonic ranging component is used to obtain the distance data; and
the combustible gas detection component, the wind direction and speed sensor, and the sound monitoring component are connected in communication with the smart gas management platform of the Internet of Things system and are used to obtain the first monitoring data and send the first monitoring data to the smart gas management platform.

8. The Internet of Things system according to claim 6, wherein the smart gas management platform is also configured to:
in response to the combustible gas concentration being greater than a second concentration threshold, control the gas leakage inspection device to release the at least one separate early warning component and control the at least one separate early warning component to turn on an alarm mode.

* * * * *